US012132582B2

(12) United States Patent
O'Keeffe et al.

(10) Patent No.: US 12,132,582 B2
(45) Date of Patent: Oct. 29, 2024

(54) SYSTEMS AND METHODS FOR UPSTREAM AND DOWNSTREAM CATV PLANT CAPACITY EXPANSION

(71) Applicant: ARRIS Enterprises LLC, Suwanee, GA (US)

(72) Inventors: Francis J. O'Keeffe, Cork (IE); Thomas J. Cloonan, Lisle, IL (US); Chris R. Zettinger, Wheaton, IL (US); Michael Harrington, Cork (IE); Patricia Tessier, Cork (IE); Darrick Wilson, Montgomery, IL (US); Oleksandr Volkov, Cork (IE); Dermot Lucey, Cork (IE)

(73) Assignee: ARRIS Enterprises LLC, Suwanee, GA (US)

( * ) Notice: Subject to any disclaimer, the term of this patent is extended or adjusted under 35 U.S.C. 154(b) by 101 days.

(21) Appl. No.: 17/325,150

(22) Filed: May 19, 2021

(65) Prior Publication Data
US 2021/0377064 A1    Dec. 2, 2021

Related U.S. Application Data

(60) Provisional application No. 63/027,108, filed on May 19, 2020.

(51) Int. Cl.
*H04L 12/28*     (2006.01)
(52) U.S. Cl.
CPC ................ *H04L 12/2801* (2013.01)
(58) Field of Classification Search
CPC .................................. H04L 12/2801

USPC ........................................................ 375/257
See application file for complete search history.

(56) References Cited

U.S. PATENT DOCUMENTS

| 6,112,232 | A | * | 8/2000 | Shahar | H04L 12/2801 725/111 |
| 10,461,764 | B1 | * | 10/2019 | Paro Filho | H03M 1/1033 |
| 2006/0126569 | A1 | * | 6/2006 | Jeong | H04L 27/2601 370/335 |
| 2010/0117883 | A1 | * | 5/2010 | Sollner | H03M 1/0695 341/172 |
| 2011/0237211 | A1 | * | 9/2011 | Alam | H04B 7/0837 455/130 |
| 2016/0182265 | A1 | * | 6/2016 | Shulman | H04L 25/02 375/340 |
| 2017/0359602 | A1 | * | 12/2017 | Rea Zanabria | H04B 10/25751 |

FOREIGN PATENT DOCUMENTS

WO    2005122580 A2    12/2005

OTHER PUBLICATIONS

International Search Report and Written Opinion Re: Application No. PCT/US2021/033272 (dated Jul. 16, 2021).

(Continued)

*Primary Examiner* — Kevin M Burd
(74) *Attorney, Agent, or Firm* — Chernoff, Vilhauer, McClung & Stenzel, LLP

(57) ABSTRACT

Systems and methods for permitting DOCSIS 3.1 equipment to operate at higher frequencies than specified in the DOCSIS 3.1 standard. Exemplary systems may be capable of alternating between a first mode of operation that provides DOCSIS 3.1 compatible services and a second mode of operation providing a higher level of service than DOCSIS 3.1.

16 Claims, 15 Drawing Sheets

Overall HFC System Block Diagram

(56) References Cited

OTHER PUBLICATIONS

Rohde & Schwarz: "Docsis 3.1 Application Note", Feb. 26, 2015 (Feb. 26, 2015). XP055375720, Retrieved from the Internet: URL:https://cdn.rohde-schwarz.com/pws/dl_downloads/dl_application/application_notes/ 7mh89/7MH89 0E.pdf, the whole document figure 1.

* cited by examiner

Overall HFC System Block Diagram

| 2x4 w/ DS Up-conversion Only | | | | | | | |
|---|---|---|---|---|---|---|---|
| Option | Bottom of US Spectrum (MHz) | Top of US Spectrum (MHz) | # 6.4 MHz ATDMA Channels | # 96 MHz OFDMA Blocks | Total US Spectral Range (MHz) | Total US BW Capacity (Gbps) | Bottom of DS SC-QAM Spectrum (MHz) |
| A | 5 | 42 | 0 | 0.39 | 37 | 0.26 | 54 |
| B | 5 | 85 | 0 | 0.83 | 80 | 0.56 | 108 |
| C | 5 | 204 | 1 | 2.00 | 199 | 1.37 | 258 |
| D | 5 | 300 | 12 | 2.00 | 295 | 1.64 | 372 |
| 2x2 w/ DS Up-conversion & US Down-conversion | | | | | | | |
| Option | Bottom of US Spectrum (MHz) | Top of US Spectrum (MHz) | # 6.4 MHz ATDMA Channels | # 96 MHz OFDMA Blocks | Total US Spectral Range (MHz) | Total US BW Capacity (Gbps) | Bottom of DS SC-QAM Spectrum (MHz) |
| A | 5 | 42 | 0 | 0.39 | 37 | 0.26 | 54 |
| B | 5 | 85 | 0 | 0.83 | 80 | 0.56 | 108 |
| C | 5 | 204 | 0 | 2.07 | 199 | 1.39 | 258 |
| D | 5 | 300 | 0 | 3.07 | 295 | 2.07 | 372 |
| E | 5 | 396 | 1 | 4.00 | 391 | 2.71 | 492 |
| F | 5 | 492 | 12 | 4.00 | 487 | 2.99 | 606 |

FIG. 4

| Top of DS SC-QAM Spectrum (MHz) | Bottom of DS OFDM Spectrum (MHz) | Top of DS OFDM Spectrum (MHz) | # 6 MHz SC-QAM Channels | # 192 MHz OFDM Blocks | Total DS Spectral Range (MHz) | Total DS BW Capacity (Gbps) |
|---|---|---|---|---|---|---|
| 630 | 630 | 1782 | 96 | 6 | 1728 | 13.23 |
| 642 | 642 | 1794 | 89 | 6 | 1686 | 12.96 |
| 642 | 642 | 1794 | 64 | 6 | 1536 | 11.99 |
| 642 | 642 | 1794 | 45 | 6 | 1422 | 11.25 |
| | | | | | | |
| Top of DS SC-QAM Spectrum (MHz) | Bottom of DS OFDM Spectrum (MHz) | Top of DS OFDM Spectrum (MHz) | # 6 MHz SC-QAM Channels | # 192 MHz OFDM Blocks | Total DS Spectral Range (MHz) | Total DS BW Capacity (Gbps) |
| 630 | 630 | 1782 | 96 | 6 | 1728 | 13.23 |
| 642 | 642 | 1794 | 89 | 6 | 1686 | 12.96 |
| 642 | 642 | 1794 | 64 | 6 | 1536 | 11.99 |
| 642 | 642 | 1794 | 45 | 6 | 1422 | 11.25 |
| 642 | 642 | 1794 | 25 | 6 | 1302 | 10.47 |
| 642 | 642 | 1794 | 6 | 6 | 1188 | 9.74 |

FIG. 4 (Continued)

SYSTEMS AND METHODS FOR UPSTREAM AND DOWNSTREAM CATV PLANT CAPACITY EXPANSION

CROSS REFERENCE TO RELATED APPLICATIONS

The present application claims priority under 35 U.S.C. § 119(e) to U.S. Provisional Application No. 63/027,108 filed on May 19, 2020, which is incorporated by reference herein in its entirety.

BACKGROUND

The subject matter of this application relates to improved systems and methods that deliver CATV, digital, and Internet services to customers.

Cable Television (CATV) services typically provide content to large groups of subscribers from a central delivery unit, called a "head end," which distributes channels of content to its subscribers from this central unit through a branch network comprising a multitude of intermediate nodes. Modern Cable Television (CATV) service networks, however, not only provide media content such as television channels and music channels to a customer, but also provide a host of digital communication services such as Internet Service, Video-on-Demand, telephone service such as VoIP, and so forth. These digital communication services, in turn, require not only communication in a downstream direction from the head end, through the intermediate nodes and to a subscriber, but also require communication in an upstream direction from a subscriber and to the content provider through the branch network.

To this end, CATV head ends have historically included a separate Cable Modem Termination System (CMTS), used to provide high speed data services, such as video, cable Internet, Voice over Internet Protocol, etc. to cable subscribers. Typically, a CMTS will include both Ethernet interfaces (or other more traditional high-speed data interfaces) as well as RF interfaces so that traffic coming from the Internet can be routed (or bridged) through the Ethernet interface, through the CMTS, and then onto the optical RF interfaces that are connected to the cable company's hybrid fiber coax (HFC) system. Downstream traffic is delivered from the CMTS to a cable modem in a subscriber's home, while upstream traffic is delivered from a cable modem in a subscriber's home back to the CMTS. Many modern CATV systems have combined the functionality of the CMTS with the video delivery system (EdgeQAM) in a single platform called the Converged Cable Access Platform (CCAP). Still other modern CATV systems called Remote PHY (or R-PHY) relocate the physical layer (PHY) of a traditional CCAP by pushing it to the network's fiber nodes. Thus, while the core in the CCAP performs the higher layer processing, the R-PHY device in the node converts the downstream data sent by the core from digital-to-analog to be transmitted on radio frequency, and converts the upstream RF data sent by cable modems from analog-to-digital format to be transmitted optically to the core.

Regardless of which architectures were employed, historical implementations of CATV systems bifurcated available bandwidth into upstream and downstream transmissions, i.e. data was only transmitted in one direction across any part of the spectrum. For example, early iterations of the Data Over Cable Service Interface Specification (DOCSIS) specified assigned upstream transmissions to a frequency spectrum between 5 MHz and 42 MHz and assigned downstream transmissions to a frequency spectrum between 50 MHz and 750 MHz. Though later iterations of the DOCSIS standard expanded the width of the spectrum reserved for each of the upstream and downstream transmission paths, the spectrum assigned to each respective direction did not overlap.

Recently, cable operators have searched for alternative architectures to satisfy ever-increasing demand for both upstream and downstream services. One such proposed architecture, for example, is full duplex (FDX) DOCSIS technology. With FDX DOCSIS, upstream and downstream spectrum is no longer separated, allowing up to 5 Gbps upstream service and 10 Gbps downstream service over the cable access network. In a full duplex system, because the CCAP/R-PHY core knows the characteristics of its own downstream transmission, it can distinguish upstream communications transmitted in the same frequencies that it provides those downstream services. Full duplex technology, however, is unsuitable to the longer HFC plants that exist in most operators' networks. Furthermore, in FDX systems, subscribers must be organized into "interference groups" to mitigate interference in downstream transmissions to some subscribers caused by upstream transmissions by other subscribers, but the presence of amplifiers located between a customers' premises and the closest node inhibits the separation of those customers into groups because the amplifiers cause all subscribers to interfere with each other. Theoretically, this problem could be addressed by eliminating the amplifiers running fiber to each subscriber's premises, but this is costly.

Alternatively, other proposed architectures would increase the spectrum of both services to customers in both upstream and downstream directions, moving the split between these services upwards. Again, however, upgrading the equipment from the head end to the subscribers premises to accommodate the increase in bandwidth is expensive.

What is desired, therefore, are improved systems and methods for providing increased bandwidth of CATV services to customers.

BRIEF DESCRIPTION OF THE DRAWINGS

For a better understanding of the invention, and to show how the same may be carried into effect, reference will now be made, by way of example, to the accompanying drawings, in which:

FIG. 4 shows the different bandwidth capacities of the variable configurations of the systems of FIGS. 2A, 2B, and 3.

DETAILED DESCRIPTION

Figure 1:
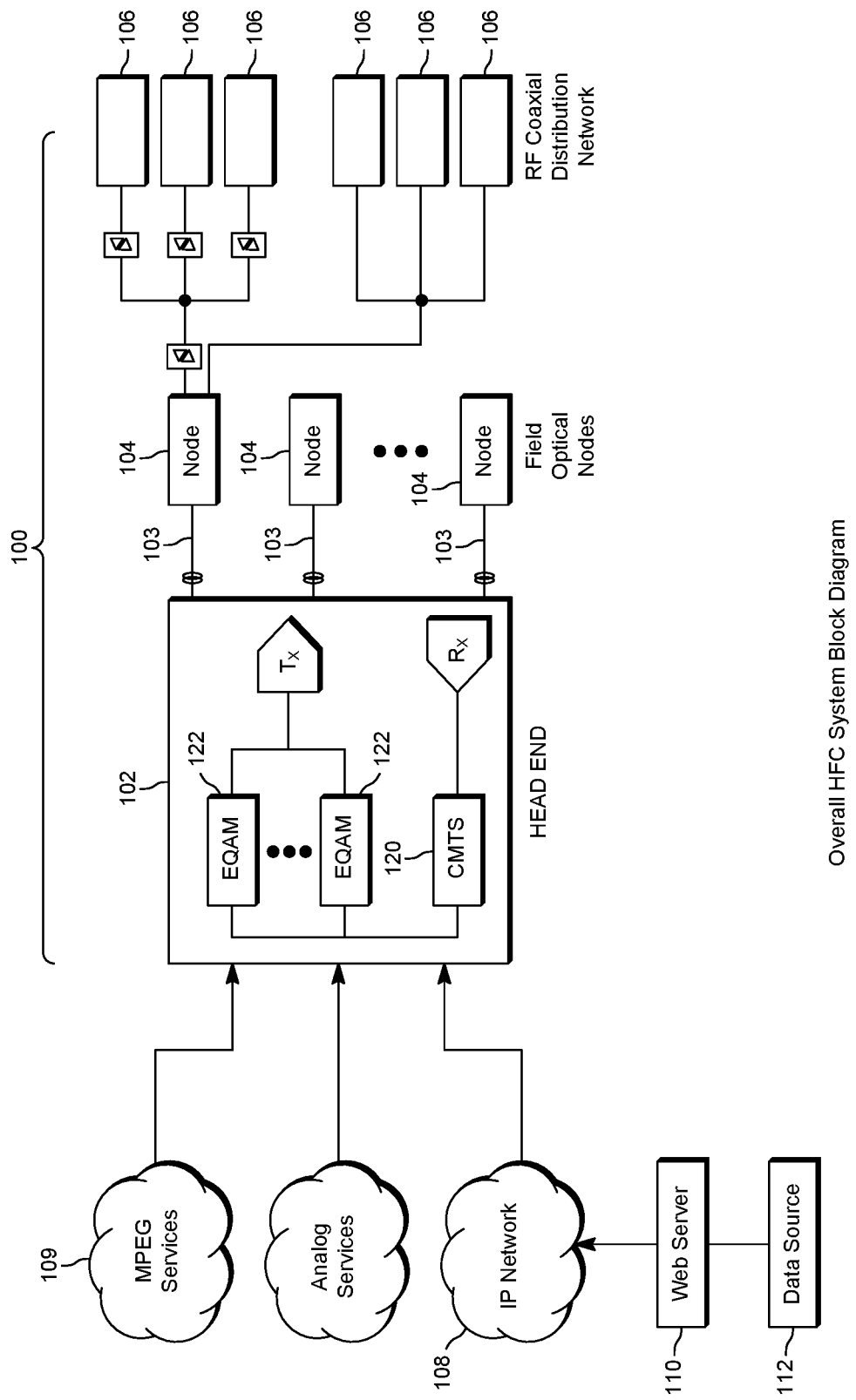
FIG. 1 shows an exemplary CATV architecture capable of using the disclosed systems and methods

FIG. 1 generally shows an exemplary CATV Hybrid Fiber Coax (HFC) architecture used to illustrate the benefits of the systems and methods disclosed herein. Those of ordinary skill in the art will appreciate, however, that the disclosed systems and methods may be used in different CATV architectures, such as distributed access architectures for example, which transfer functionality traditionally reserved to the head end or CCAP into nodes or other elements of the distribution network, including R-PHY, MACPHY, R-MACPHY architectures etc. The network shown in FIG. 1 is an HFC broadband network that combines the use of optical fiber and coaxial connections. The network includes a head end 102 that receives analog video signals and digital bit streams representing different services (e.g., video, voice, and Internet) from various digital information sources. For example, the head end 102 may receive content from one or more video on demand (VOD) servers, IPTV broadcast video servers, Internet video sources, or other suitable sources for providing IP content.

An IP network 108 may include a web server 110 and a data source 112. The web server 110 is a streaming server that uses the IP protocol to deliver video-on-demand, audio-on-demand, and pay-per view streams to the IP network 108. The IP data source 112 may be connected to a regional area or backbone network (not shown) that transmits IP content. For example, the regional area network can be or include the Internet or an IP-based network, a computer network, a web-based network or other suitable wired or wireless network or network system.

At the head end 102, the various services are encoded, modulated and upconverted onto RF carriers, combined onto a single electrical signal and inserted into a broadband optical transmitter. A fiber optic network extends from the cable operator's master/regional head end 102 to a plurality of fiber optic nodes 104. The head end 102 may contain an optical transmitter or transceiver to provide optical communications through optical fibers 103. Regional head ends and/or neighborhood hub sites may also exist between the head end and one or more nodes. The fiber optic portion of the example HFC network 100 extends from the head end 102 to the regional head end/hub and/or to a plurality of nodes 104. The optical transmitter converts the electrical signal to a downstream optically modulated signal that is sent to the nodes. In turn, the optical nodes convert inbound signals to RF energy and return RF signals to optical signals along a return path. In the specification, the drawings, and the claims, the terms "forward path" and "downstream" may be interchangeably used to refer to a path from a head end to a node, a node to a subscriber, or a head end to a subscriber. Conversely, the terms "return path", "reverse path" and "upstream" may be interchangeably used to refer to a path from a subscriber to a node, a node to a head end, or a subscriber to a head end. Also, in the specification, in the drawings, and the claims a node may be any digital hub between a head end and a customer home that transports local requests over the CATV network. Forward path optical communications over the optical fiber may be converted at the nodes to Radio Frequency (RF) communications for transmission over the coaxial cable to the subscribers. Conversely, return path RF communications from the subscribers are provided over coaxial cables and are typically converted at a node to optical signals for transmission over the optical fiber to the head end. Each node 104 may contain a return path transmitter that is able to relay communications upstream from a subscriber device 106 to the head end 102.

Each node 104 serves a service group comprising one or more customer locations. By way of example, a single node 104 may be connected to thousands of cable modems or other subscriber devices 106. In an example, a fiber node may serve between one and two thousand or more customer locations. In an HFC network, the fiber optic node 104 may be connected to a plurality of subscriber devices 106 via a coaxial cable cascade, though those of ordinary skill in the art will appreciate that the coaxial cascade may comprise a combination of fiber optic cable and coaxial cable. In some implementations, each node 104 may include a broadband optical receiver to convert the downstream optically modulated signal received from the head end or a hub to an electrical signal provided to the subscribers' devices 106. Signals may pass from the node 104 to the subscriber devices 106 via the RF cascade, which may be comprised of multiple amplifiers and active or passive devices including cabling, taps, splitters, and in-line equalizers. It should be understood that the amplifiers in the RF cascade may be bidirectional, and may be cascaded such that an amplifier may not only feed an amplifier further along in the cascade but may also feed a large number of subscribers. The tap is the customer's drop interface to the coaxial system. Taps are designed in various values to allow amplitude consistency along the distribution system.

The subscriber devices 106 may reside at a customer location, such as a home of a cable subscriber, and are connected to the cable modem termination system (CMTS) 120 or comparable component located in a head end. A client device 106 may be a modem, e.g., cable modem, MTA (media terminal adaptor), set top box, terminal device, television equipped with set top box, Data Over Cable Service Interface Specification (DOCSIS) terminal device, customer premises equipment (CPE), router, or similar electronic client, end, or terminal devices of subscribers. For example, cable modems and IP set top boxes may support data connection to the Internet and other computer networks via the cable network, and the cable network provides bi-directional communication systems in which data can be sent downstream from the head end to a subscriber and upstream from a subscriber to the head end.

The techniques disclosed herein may be applied to systems compliant with DOCSIS. The cable industry developed the international Data Over Cable System Interface Specification (DOCSIS®) standard or protocol to enable the delivery of IP data packets over cable systems. In general, DOCSIS defines the communications and operations support interface requirements for a data over cable system. For example, DOCSIS defines the interface requirements for cable modems involved in high-speed data distribution over cable television system networks. However, it should be understood that the techniques disclosed herein may apply to any system for digital services transmission, such as digital video or Ethernet PON over Coax (EPoc). Examples herein referring to DOCSIS are illustrative and representative of the application of the techniques to a broad range of services carried over coax.

References are made in the present disclosure to a Cable Modem Termination System (CMTS) in the head end 102. In general, the CMTS is a component located at the head end or hub site of the network that exchanges signals between the head end and client devices within the cable network infrastructure. In an example DOCSIS arrangement, for example, the CMTS and the cable modem may be the endpoints of the DOCSIS protocol, with the hybrid fiber coax (HFC) cable plant transmitting information between these endpoints. It will be appreciated that architecture 100 includes one CMTS for illustrative purposes only, as it is in fact customary that multiple CMTSs and their Cable Modems are managed through the management network.

The CMTS 120 hosts downstream and upstream ports and contains numerous receivers, each receiver handling communications between hundreds of end user network elements connected to the broadband network. For example, each CMTS 120 may be connected to several modems of many subscribers, e.g., a single CMTS may be connected to hundreds of modems that vary widely in communication characteristics. In many instances several nodes, such as fiber optic nodes 104, may serve a particular area of a town or city. DOCSIS enables IP packets to pass between devices on either side of the link between the CMTS and the cable modem.

It should be understood that the CMTS is a non-limiting example of a component in the cable network that may be used to exchange signals between the head end and subscriber devices 106 within the cable network infrastructure. For example, other non-limiting examples include a Modular CMTS (M-CMTS™) architecture or a Converged Cable Access Platform (CCAP).

An EdgeQAM (EQAM) 122 or EQAM modulator may be in the head end or hub device for receiving packets of digital content, such as video or data, re-packetizing the digital content into an MPEG transport stream, and digitally modulating the digital transport stream onto a downstream RF carrier using Quadrature Amplitude Modulation (QAM). EdgeQAMs may be used for both digital broadcast, and DOCSIS downstream transmission. In CMTS or M-CMTS implementations, data and video QAMs may be implemented on separately managed and controlled platforms. In CCAP implementations, the CMTS and edge QAM functionality may be combined in one hardware solution, thereby combining data and video delivery.

Orthogonal frequency-division multiplexing (OFDM) may utilize smaller subcarriers (compared to QAM carriers). For example, while a conventional DOCSIS QAM carrier is 6 MHz wide, the CATV system may employ orthogonal frequency division multiplexing (OFDM) technology with OFDM carriers that are approximately 25 kHz to 50 kHz wide. Thus, where previously 100 QAM carriers were used, thousands of OFDM subcarriers may be used. OFDM technology may be suitable for noisy signal conditions and may enable use of more of the available spectrum without reducing the quality of server. In example implementations, a cable network may use the QAM modulation for downstream speeds and boost upstream speeds using OFDM.

As noted previously, cable operators are under pressure to improve CATV delivery architectures to deliver higher bandwidth to customers in both upstream and downstream directions, however achieving a technically acceptable solution in a cost-effective manner has proven difficult. For example, anticipating future demand for higher-bandwidth services, the CATV industry is contemplating a new DOCSIS 4.0 standard currently being developed by CableLabs. This new standard will permit DOCSIS equipment to operate at higher frequencies than the existing standard (DOCSIS 3.1). One variant of DOCSIS 4.0 is the Full-Duplex DOCSIS or FDX architecture which concentrates on allowing the upstream spectrum to be expanded to overlap that of the downstream spectrum, but as indicated earlier, this is difficult to achieve without costly plant upgrades. A second variant of DOCSIS 4.0 is "Frequency Division Duplexing" (FDD mode) or Extended Spectrum DOCSIS (ESD), where both upstream and downstream frequency ranges are extended.

Though cable operators are anxious to deploy DOCSIS 4.0 ESD-capable equipment as soon as possible due to consumer requirements for higher bandwidths, unfortunately DOCSIS 4.0-capable Application Specific Integrated Circuits (ASICs) will not be available in the short term, partly because ASIC vendors have not yet recouped their investment in FDX ASICs (as FDX preceded FDD/ESD), and partly because of the inherently long development time associated with ASICs. While it is possible to implement the required feature set of DOCSIS 4.0 in general purpose devices such as Field Programmable Gate Arrays (FPGAs), such an implementation would be both expensive and consume excessive power, as the physical layer of DOCSIS 4.0 is large and complex.

The difference in capabilities between DOCSIS 3.1 and DOCSIS 4.0 is considerable. DOCSIS 3.1 specifies a maximum required upstream frequency range of 5-204 MHz upstream a maximum required downstream frequency range of 54-1218 MHz, where upstream and downstream spectra are non-overlapping with a guard band between them. DOCSIS 4.0, conversely specifies 5-684 MHz upstream bandwidth and 54-1794 MHz downstream bandwidth, also non-overlapping with a guard band. Nonetheless, the systems and methods disclosed herein may be used to achieve most of the extended performance of DOCSIS 4.0 using currently available devices, enabling the deployment of near-DOCSIS 4.0 capable equipment in the short term. Specifically, the disclosed systems and methods may provide an upstream bandwidth range of 5-492 MHz, with downstream bandwidth up to 1794 MHz, using existing DOCSIS 3.1-compatible components. The invention also allows flexible reallocation of spectrum between a higher number of low-bandwidth (5-300 MHz) upstream service groups and a lower number of high-bandwidth (5-492 MHz) upstream service groups.

The disclosed systems and methods take advantage of the fact that the physical layer of DOCSIS 4.0 ESD (Extended Spectrum DOCSIS) is the same as that of the previous standard, DOCSIS 3.1, apart from the extended frequency range. The systems and methods disclosed herein use DOCSIS 3.1 physical layer ASICs combined with other frequency-shifting components to allow equipment to cover most of the DOCSIS 4.0 ESD upstream frequency range and all of the DOCSIS 4.0 ESD downstream frequency range.

The disclosed systems and methods provide several key benefits. For example, the disclosed systems and methods permit Multiple Systems Operators (MSOs) to operate their systems with available chipsets (such as traditional DOCSIS 3.1 ASICs and FPGAs), permitting deployments to occur sooner, and also permits them to operate their systems in a traditional DOCSIS 3.1 mode of operation for several years (with less frequency spectrum but more Service Groups), and then it permits them to hardware or software upgrade the solution to a new DOCSIS 4.0-like mode of operation for use in later years, with more frequency spectrum but fewer Service Groups. Moreover, the disclosed systems and methods permits MSOs to operate their systems with downstream spectrum that can cover the entire DOCSIS 4.0 spectrum (up to 1794 MHz), and also operate their systems with upstream spectrum that can cover a large part of the DOCSIS 4.0 spectrum (up to 492 MHz-which is only slightly lower than the maximum of 684 MHz defined in the DOCSIS 4.0 specification). Furthermore, the disclosed systems and methods allow MSOs to increase the upstream/downstream split frequencies with a software configuration.

Figure 2A:
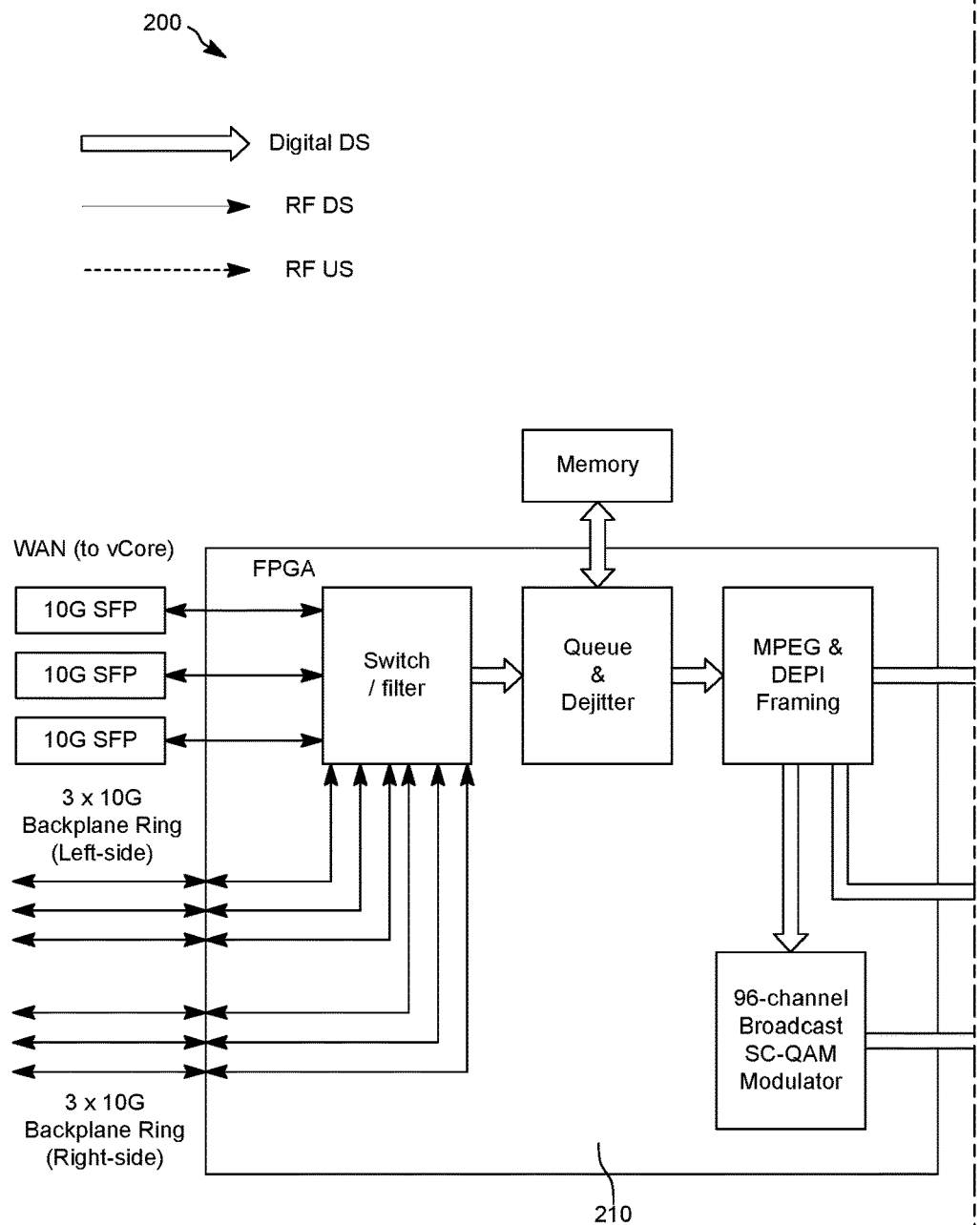
FIGS. 2A and 2B shows an exemplary system capable of configuration in either a first mode for delivering services at a lower bandwidth capacity and a second mode for delivering services at higher bandwidth capacity.
Figure 2A:
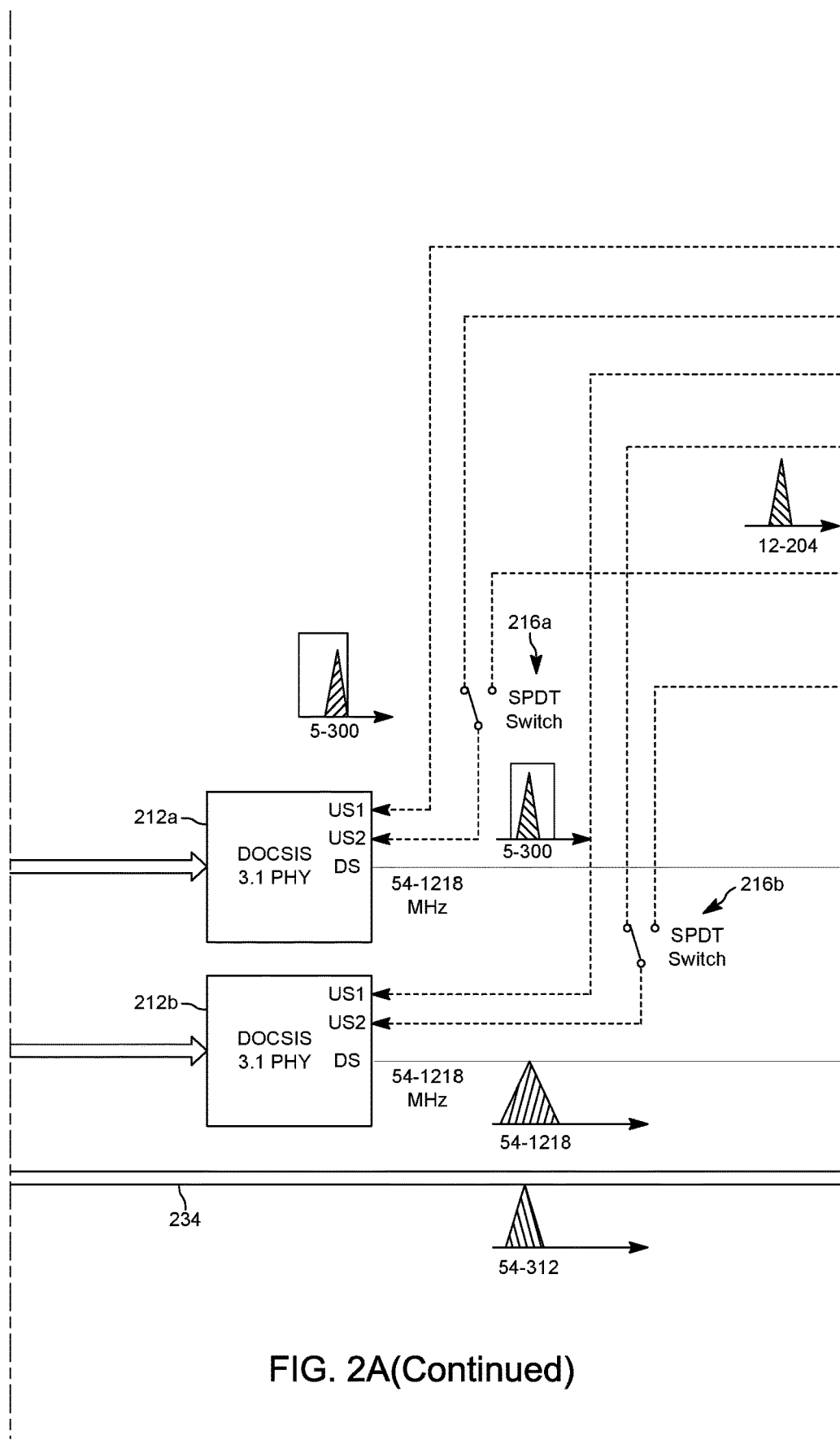
Figure 2A:
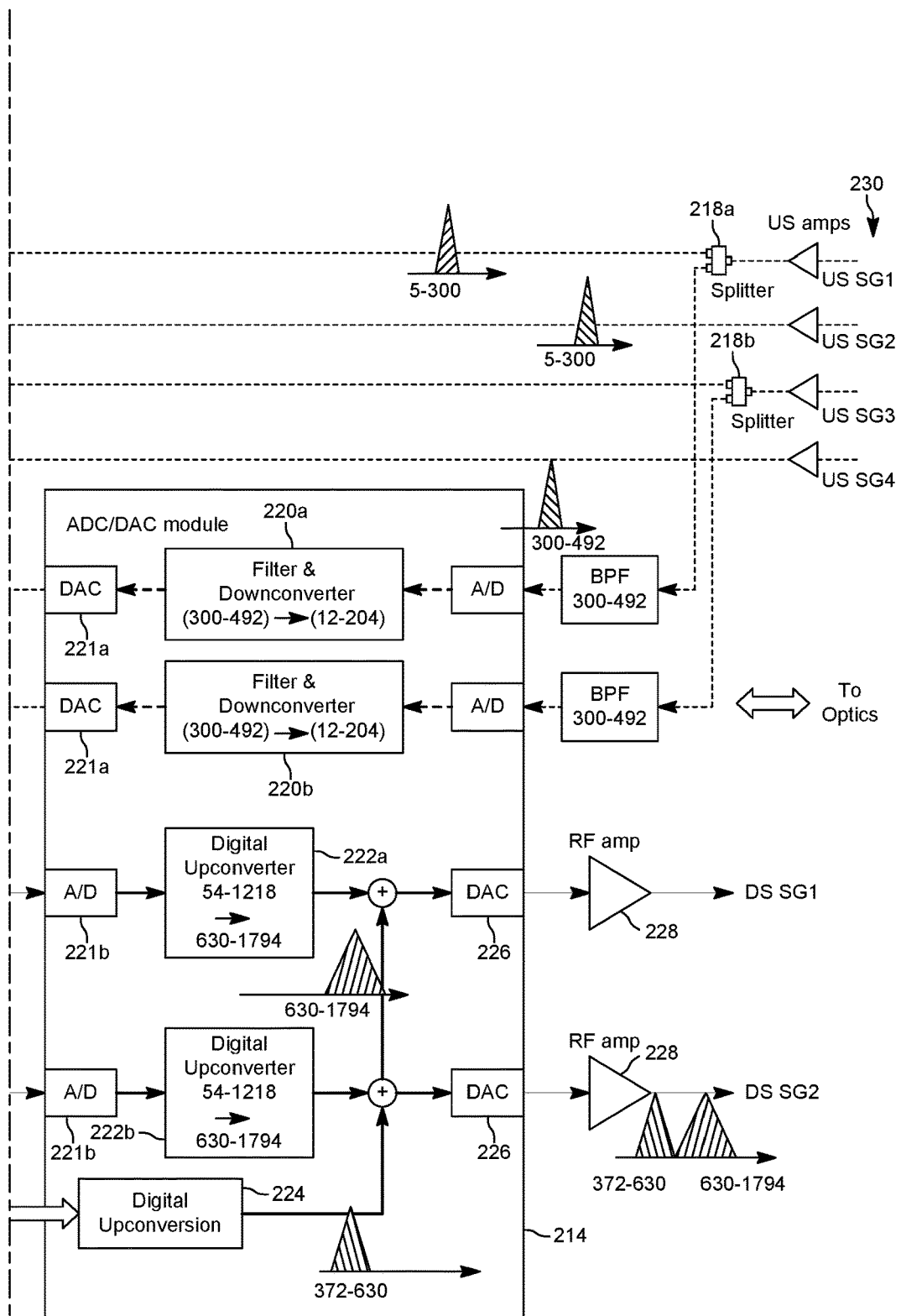
Figure 2B:
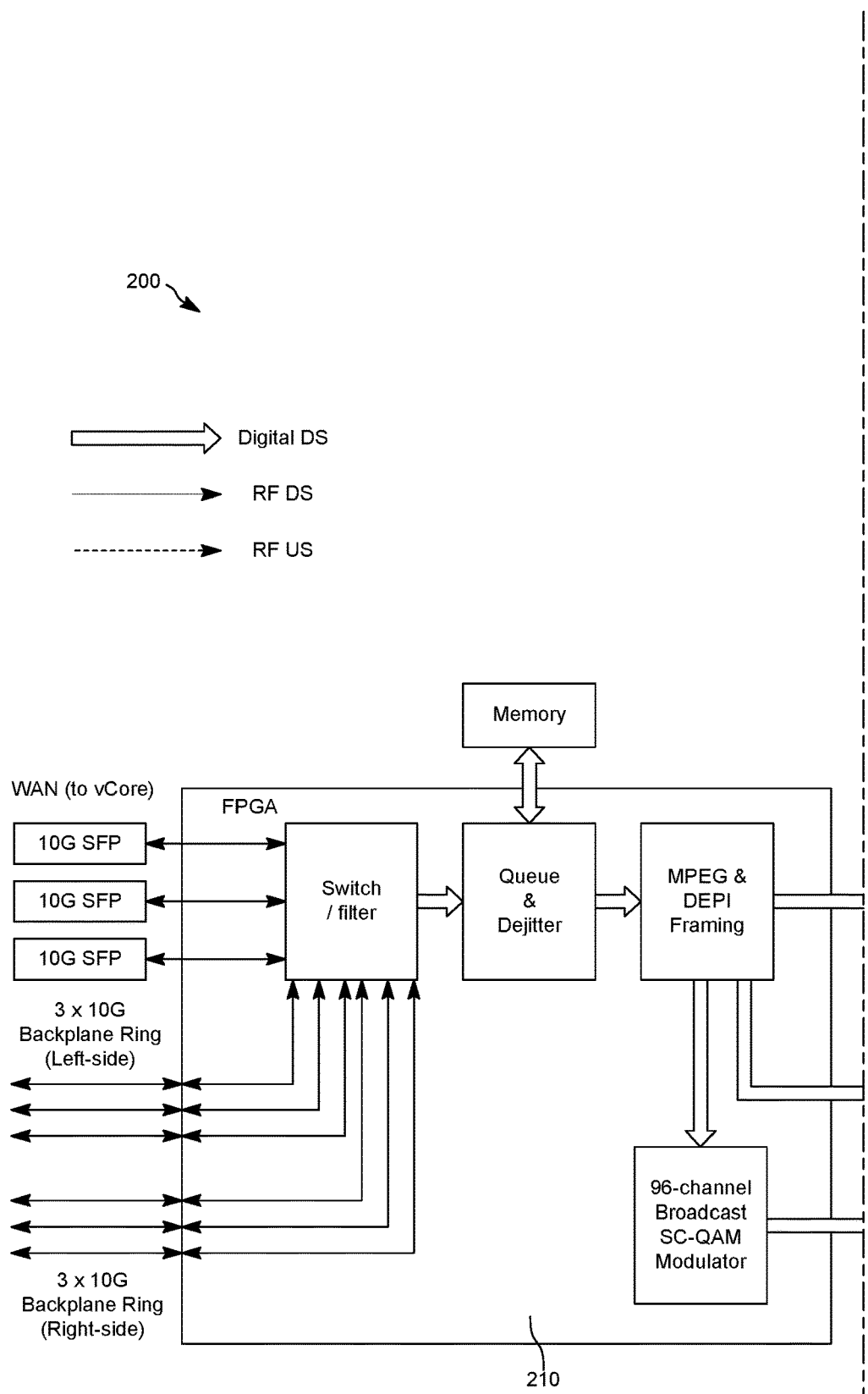
Figure 2B:
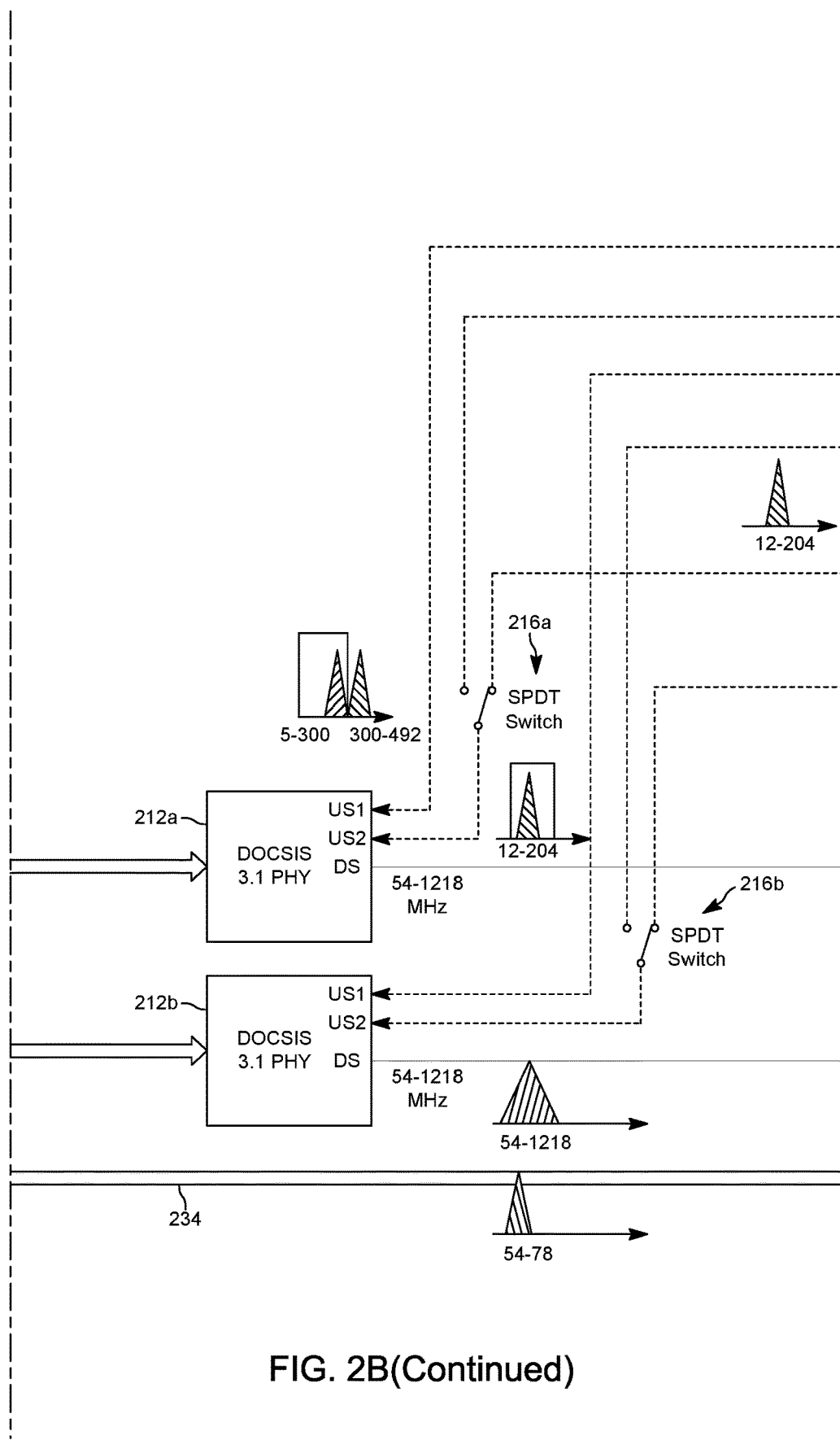
Figure 2B:
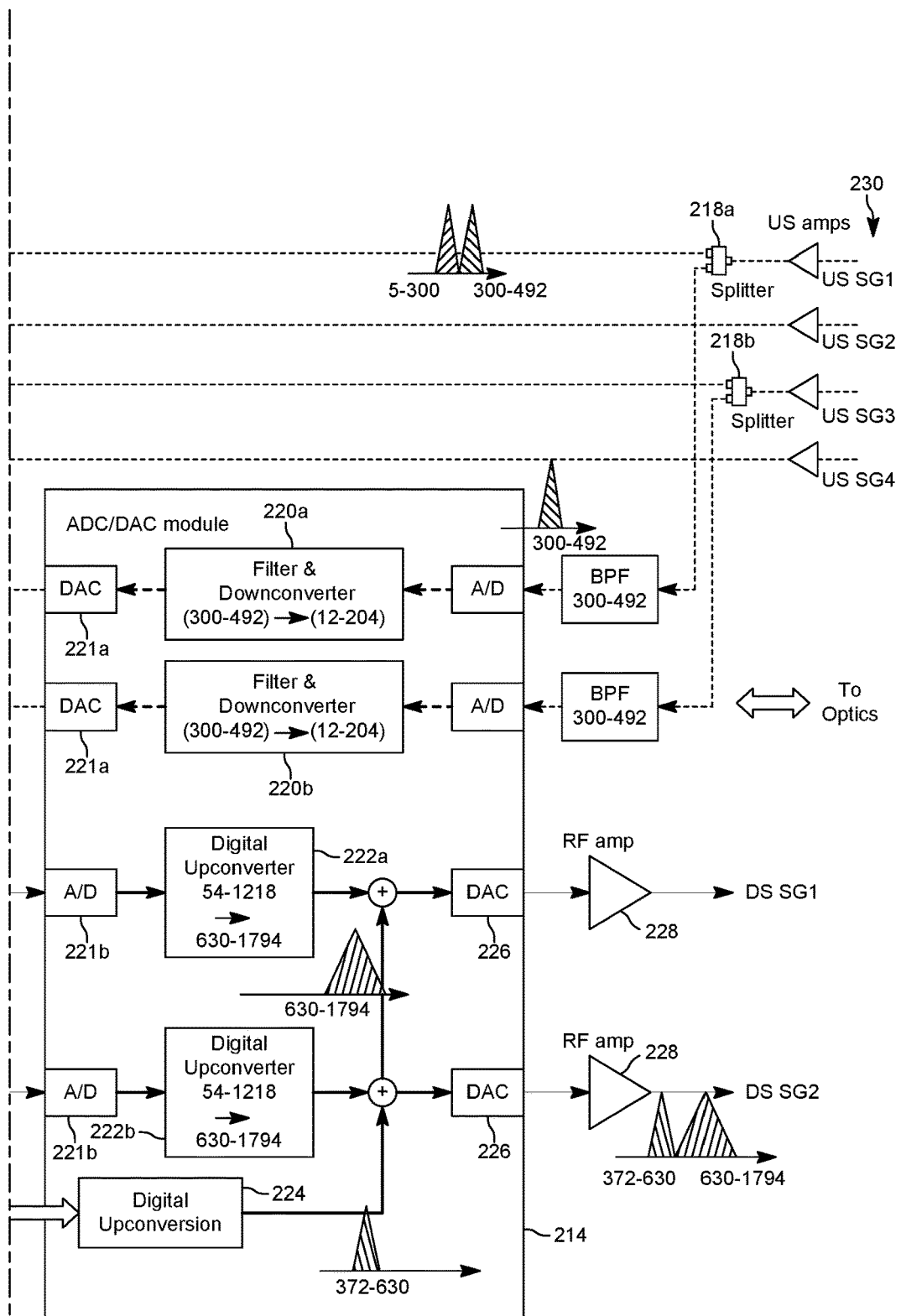

Referring specifically to FIGS. 2A and 2B, one embodiment of the disclosure may comprise a system 200 capable of alternating between a first mode of operation that provides DOCSIS 3.1 compatible services and a second mode of operation providing a higher level of service that equals or approaches those specified in DOCSIS 4.0, e.g. DOCSIS 4.0 downstream service of up to 1794 MHz and upstream service of 5-492 MHz which is very close to DOCSIS 4.0 specifications. The system 200 in some embodiments may be located in a node, such as the node 104 shown in FIG. 1 or may alternatively be located in a head end 102 or any other network device such as an Optical Line Terminal (OLT) or Optical Network Unit (ONU).

The system 200 preferably includes FPGA 210, one or more physical layer ASICs 212a, 212b, and an upconverter/downconverter (U/D) unit 214. The physical layer ASICs 212a, 212b each preferably provide Physical Layer implementation of one downstream service group and two upstream service groups. The FPGA 210 preferably provides networking functions and encodes supplementary broadcast channels to fill out extended downstream spectrum as described later in this specification.

The system 200 also preferably includes a double-throw switch 216a, 216b capable of configuring the system 200 between the two modes described in the preceding paragraph. FIG. 2A shows the system 200 when the switch 216a, 216b is positioned to configure the system in a mode of operation that provides DOCSIS 3.1 compatible services. In this configuration, upstream signals 230 are received from four separate service groups, such that two of the signals 230 pass directly to different inputs US1 and US2 of ASIC 212a and the other two of the signals 230 pass directly to different inputs US1 and US2 of ASIC 212b. Each of ASIC 212a and 212b are configured to allow, at each of their upstream inputs, signals in the 5-300 MHz range, which encompasses the required DOCSIS 3.1 upstream spectrum of 5-204 MHz. The ASICs 212a and 212b pass the upstream signals to the FPGA 210 for forwarding in the upstream direction. Thus, in this first configuration, the system 200 may support four upstream service groups, each with a bandwidth capacity that meets and even slightly exceeds the DOCSIS 3.1 requirements since the ASIC chips are designed with extra overhead to 300 MHz. Notably, each of the upstream signals from the service groups SG1, SG3 are also routed through the U/D unit 214 via splitters 218a, 218b but as can be seen in FIG. 2A, the switch 216a, 216b is in a position that terminates these signals before they reach the ASICs 212a, 212b.

In the downstream direction, the FPGA 210 provides the downstream DOCSIS 3.1 signal, occupying a bandwidth of 54-1281 MHz, to each of the ASICs 212a and 212b. In turn, the ASICs. 212a, 212b provide their associated downstream signals to a respective one of A/D converters 221b after which the digital signals are unconverted by digital upconverters 222a and 222b to a bandwidth range of 630-1794. As the output spectrum of the ASICs 212a, 212b is only 1164 MHz wide, in a preferred embodiment, the downstream signal may be supplemented by additional downstream content 234 from the FPGA 210 which is added to the lower part of the DS spectrum, as shown in the lower part of the diagram Thus, the downstream signal is expanded to the extended range of DOCSIS 4.0 and provided to two downstream service groups.

FIG. 2B, conversely, shows the system 200 when the switch 216a, 216b is positioned to configure the system in a mode of operation that approximates DOCSIS 4.0 service. In this configuration, upstream signals are received from only two service groups—SG1 and SG3; any signals from SG2 and SG4 are terminated at the switch 216a, 216b prior to the signals reaching the ASICS 212a, 212b. The signals from SG1, SG3 each comprise an expanded upstream bandwidth of 5-492 MHz, and each pass through a respective 1×2 splitter 218a, 218b such that the full 5-492 MHz signal is provided through one of the two paths following a splitter to connect to one of the inputs (US1) of a respective ASIC 212a, 212b. However, each ASIC is only configured to process the signal that resides in the 5-300 MHz spectrum. Accordingly, the signal from the second path from each of the splitters 218a, 218b is provided to a bandpass filter that only allows the remaining portion of the upstream signal between 300-492 MHz to be passed to the U/D unit 214 via an A/D converter, after which each signal is downconverted to the 12-204 spectrum and provided to the second input (US2) of a respective ASIC 212a, 212b after conversion back to the analog domain via D/A converters 221a. Thus, in the second mode of operation attained by the selective position of the switch 216, upstream transmissions achieve near DOCSIS 4.0 quality. Downstream signal processing in the second mode of operation is the same as is described with respect to FIG. 2A, except that less spectrum augmentation is required in this case due to the wider upstream spectrum.

Figure 3:
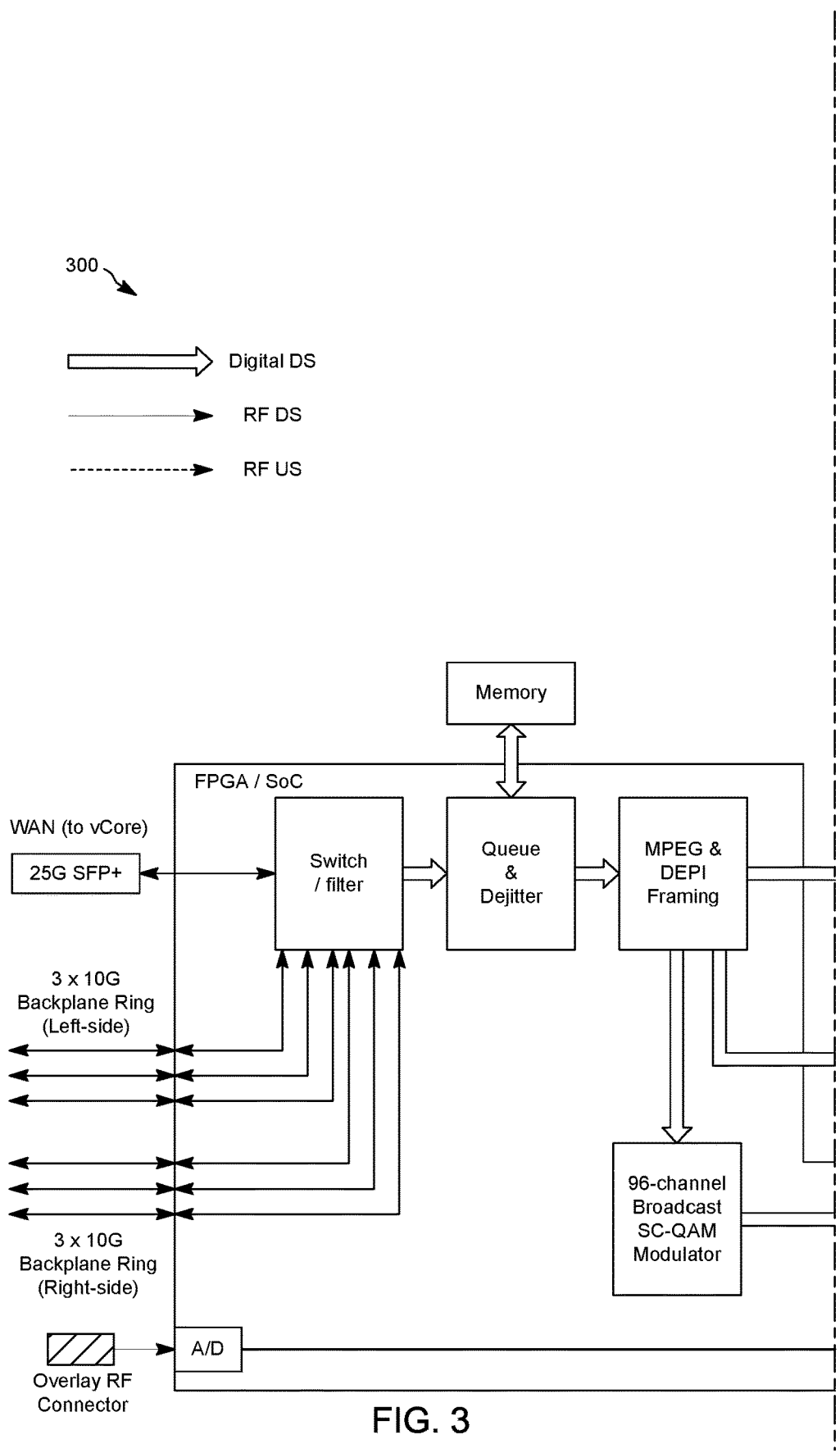
FIG. 3 shows an alternate system capable of configuration in either a first mode for delivering services at a lower bandwidth capacity and a second mode for delivering services at higher bandwidth capacity.
Figure 3:
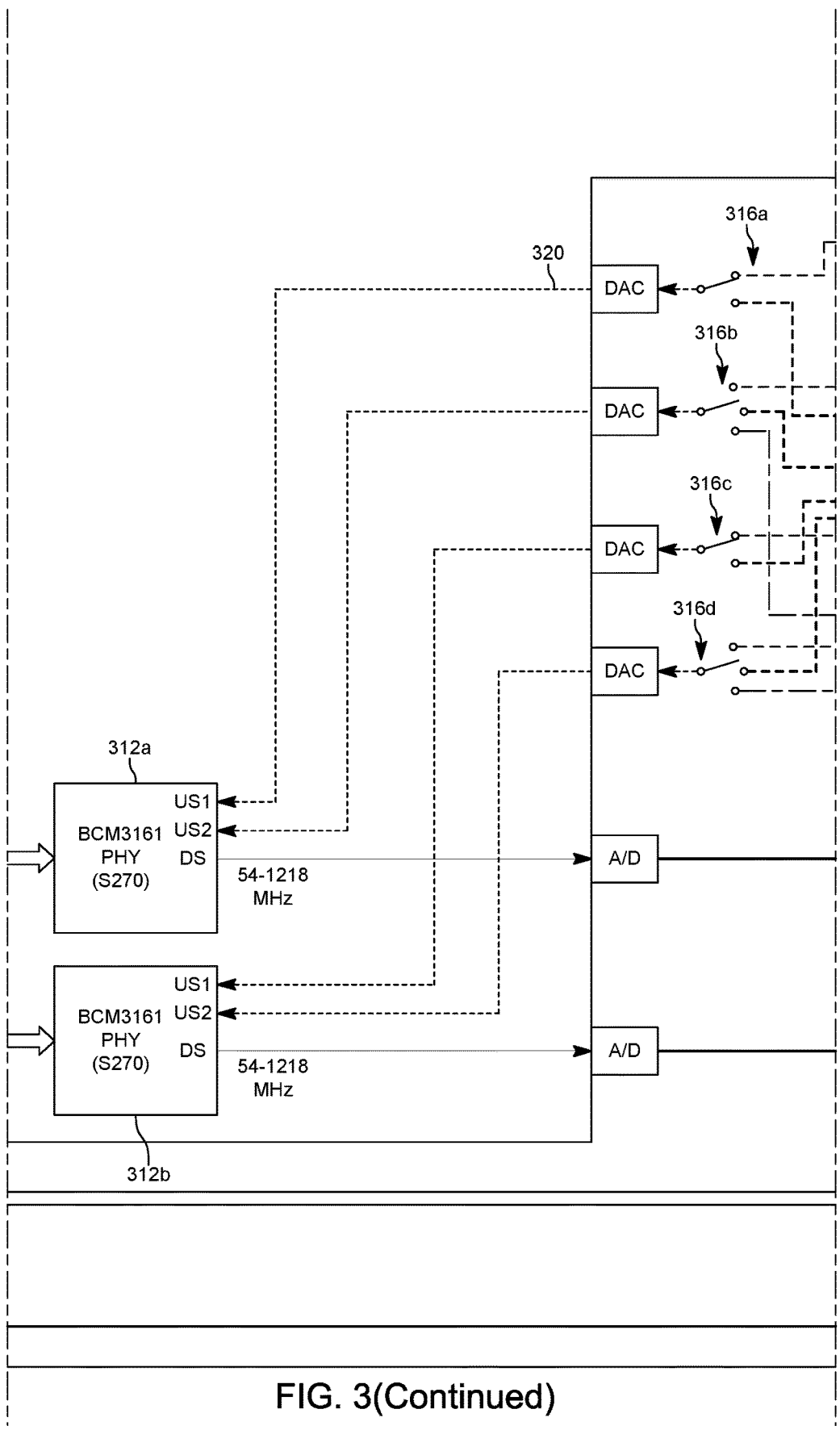
Figure 3:
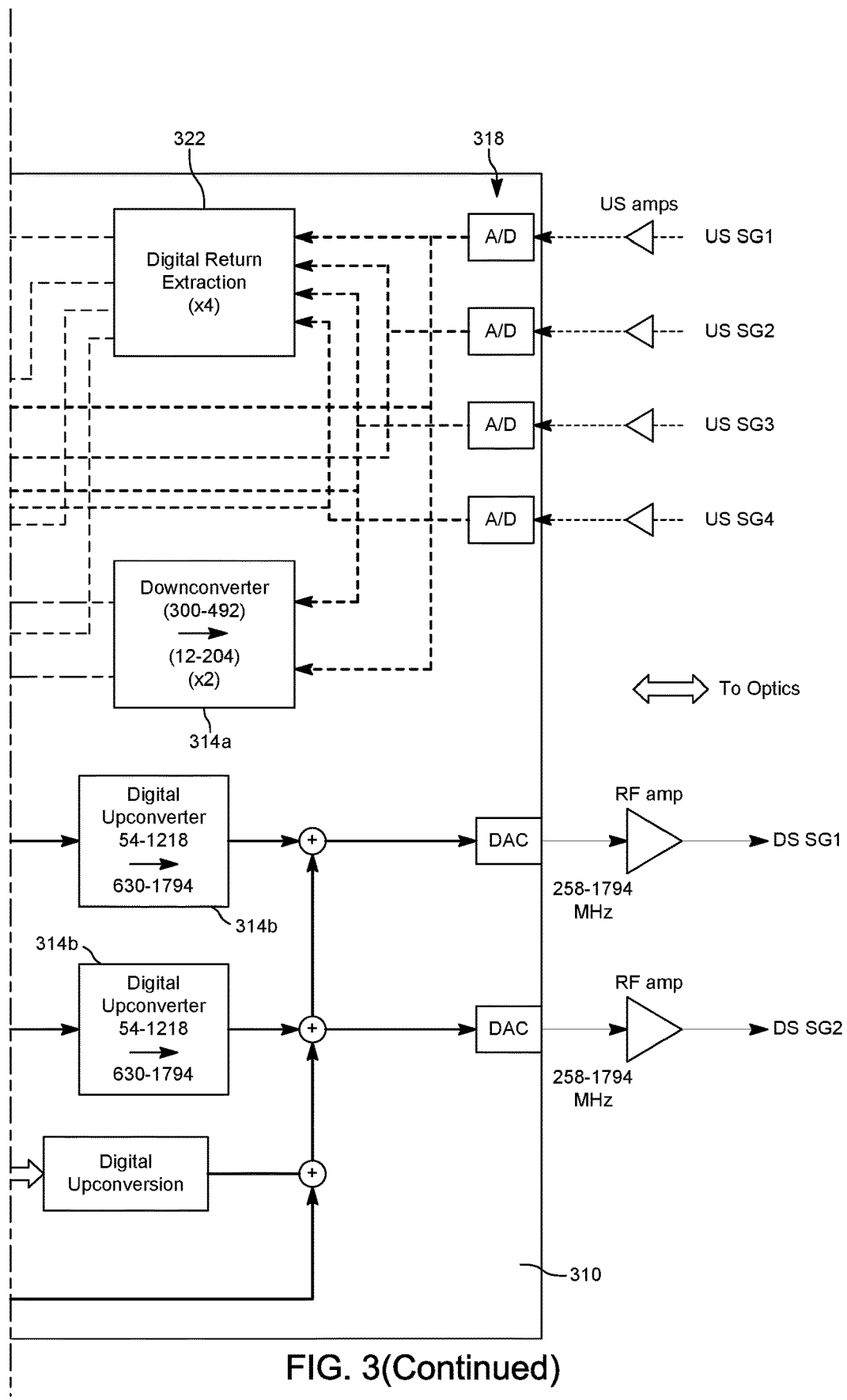

FIG. 3 shows an alternate system capable of alternating between first, second, and third modes of operation, the first two of which provide DOCSIS 3.1 compatible services with an optional Digital Return feature, and the third mode of operation providing a higher level of service that equals or approaches those specified in DOCSIS 4.0 along with the digital return feature. In the system 300, the functionality of the FPGA and the U/D unit is combined into a single FPGA-RFSoC (Radio Frequency System-on-Chip) 310. In each of the three modes of operation, the downstream functionality of the combined FPGA-RFSoC 310 matches that which was described with respect to FIGS. 2A and 2B. In the upstream direction, in a first mode of operation, upstream signals from four service groups SG1 to SG4 are provided directly through respective ADCs 318 and DACs 320 on the RFSoC 310 to a respective one of inputs US1, US2 of a respective ASIC 312a or 312b, as with respect to FIGS. 2A and 2B. This first mode of operation is achieved when the switches 316a to 316d all connect to position ending at the solid lines shown in FIG. 3, and in this mode the upstream signals conform to DOCSIS 3.1.

A second mode of operation also includes upstream signals that conform to DOCSIS 3.1, but also implements "Digital Return"—a method in which upstream services are digitized at the HFC node and fed to the headend in a sample bitstream over digital optics. In this mode, which occurs when the switches 16a and 16b are all connected to the position ending at the dashed lines shown in FIG. 3, all RF signals are fed into the RFSoC Digital Return Extraction Unit 322 before being directed into the DACs 316a to 316b that feed the ASICs.

In the third mode of operation, the switches 316a and 316c are thrown to the solid lines, as with the first mode, but switches 316b and 316d are thrown to the position terminating at the dotted lines extending from the downconverter 314a. As can be seen in FIG. 3, the signals from the first and third service groups not only propagate along the solid path to switches 316a and 316c, but also feed into the downconverter 314. Thus, when the switches 316b and 316d are thrown to connect to the outputs of the downconverter to US2 ports, downsampled signals from SG 1 and SG3 may be provided to the ASICs 312a and 312b to achieve the same functionality as described with respect to FIG. 2B, i.e. to allow upstream bandwidth from the two service groups to approximate DOCSIS 4.0 ESD service levels. Though not shown, the RFSoC includes the filtering functionality used to pass a part of the wide-bandwidth upstream signals from a service group to one port of an ASIC and pass the remaining part to the other port of the ASIC.

FIG. 4 shows the different bandwidth capacities of the variable configurations of the systems of FIGS. 2A, 2B, and 3. For example, as can be seen in this chart, in a 2×4 mode of operation of a DOCSIS system where only the downstream signal is upconverted, the ASICS will only provide up to 300 MHz of available upstream spectrum that can be shifted from available downstream capacity. In the disclosed systems and methods, however, the upstream spectrum can be extended to 492 MHz, albeit by reducing available downstream spectrum.

Figure 5:
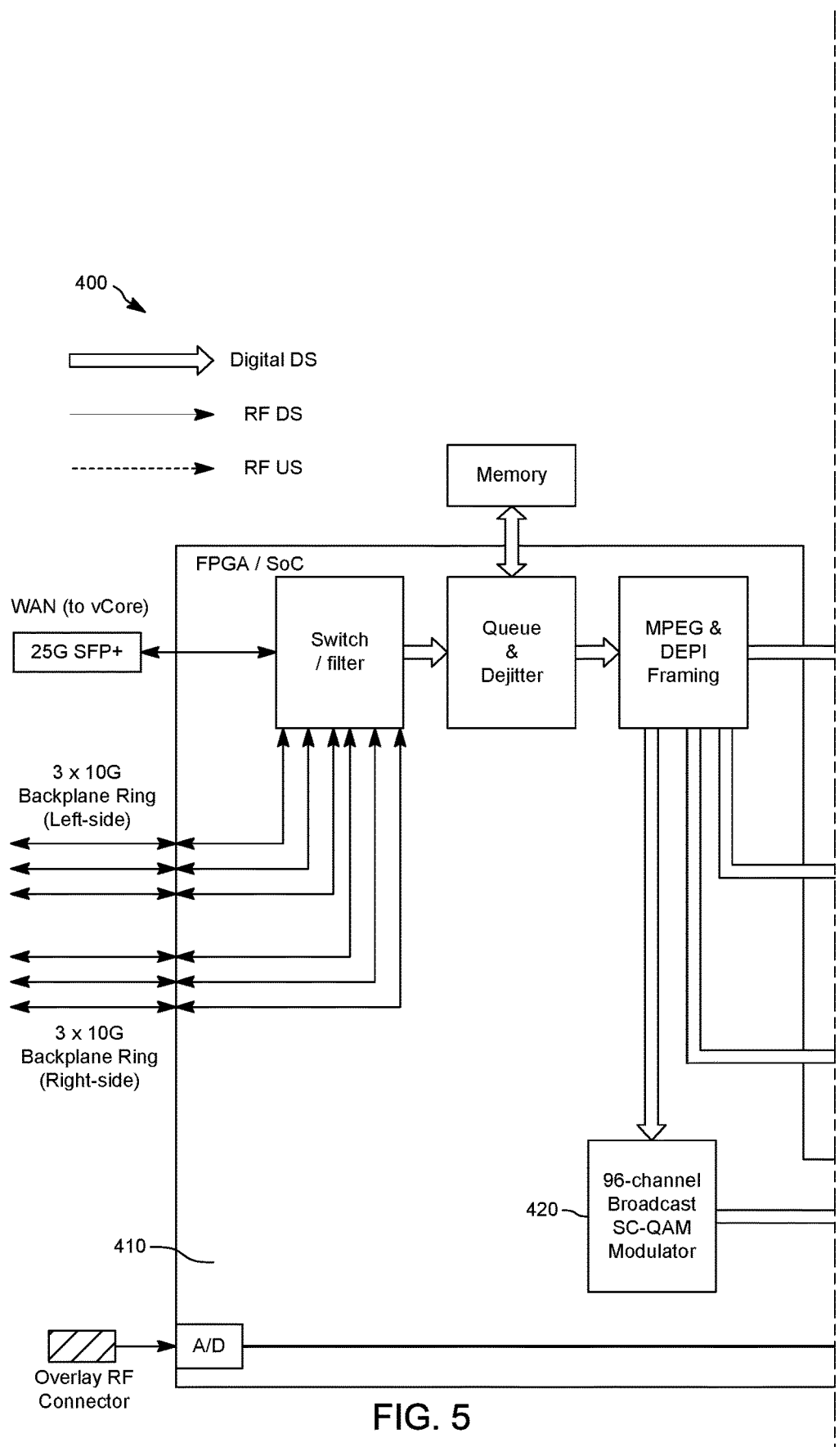
FIG. 5 shows an alternate embodiment of the system of FIG. 3.
Figure 5:
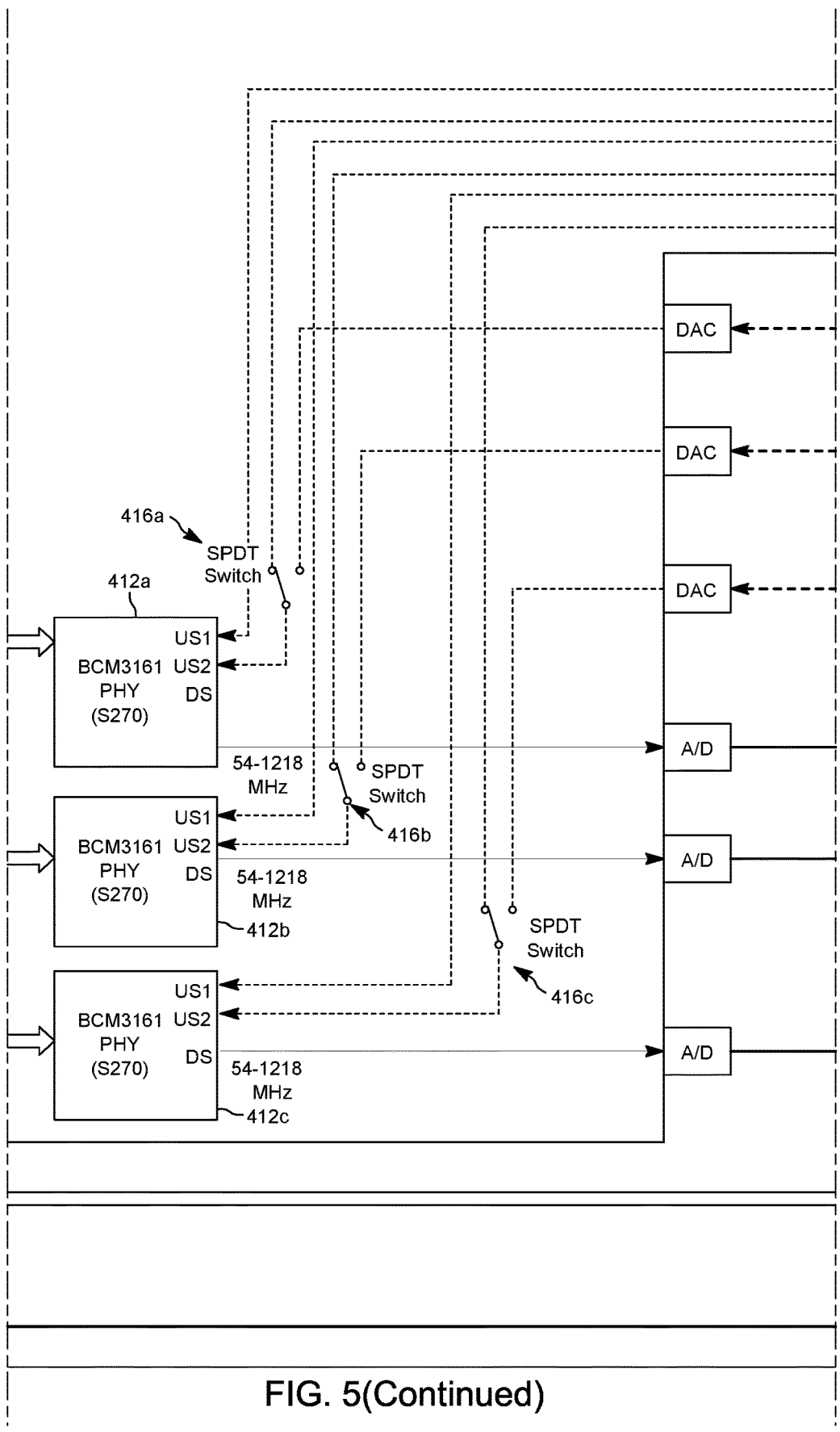
Figure 5:
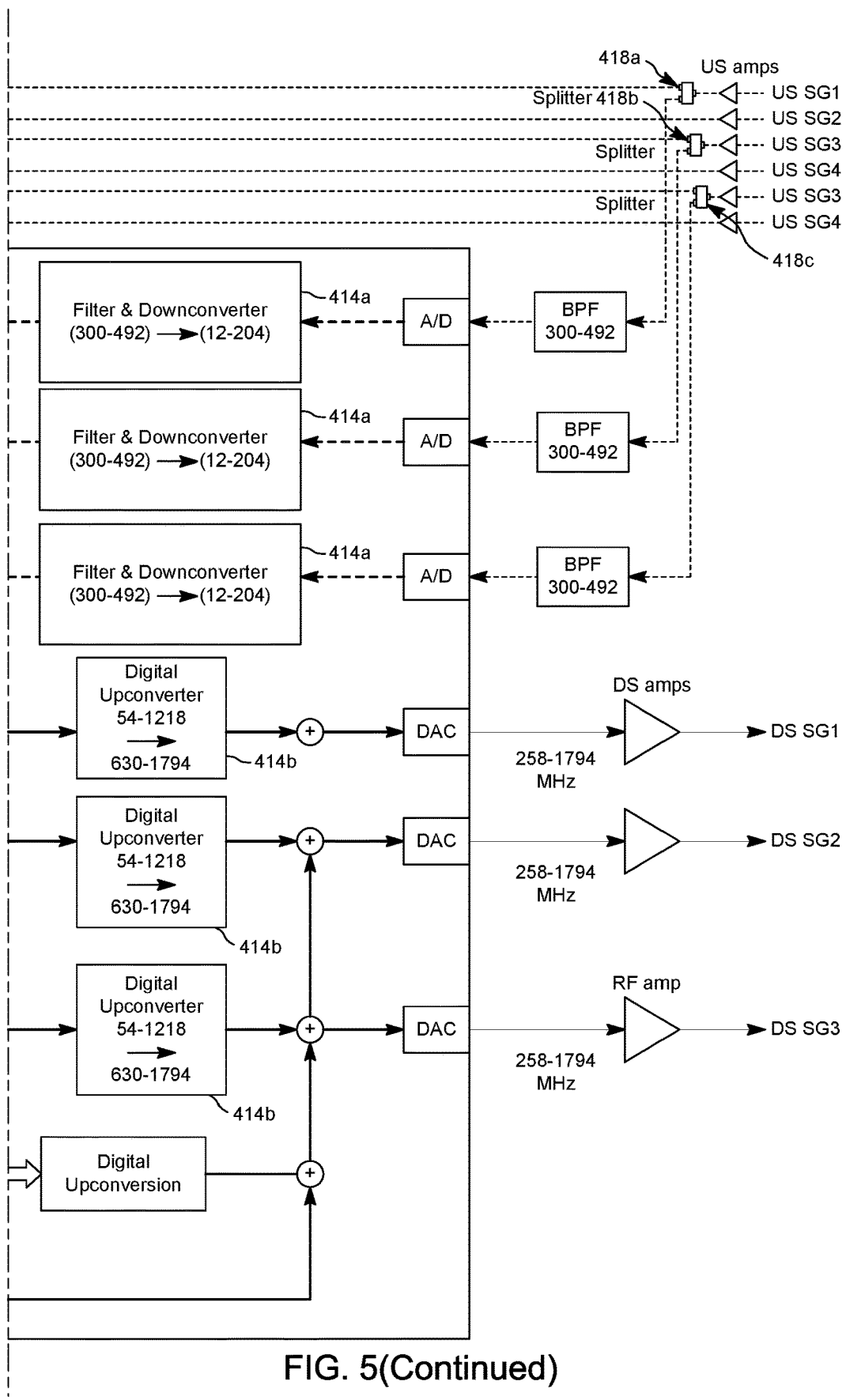

Those of ordinary skill in the art will appreciate that although FIGS. 2A, 2B, and 3 each show an embodiment capable of alternating an architecture from one in which four upstream and two downstream SGs are serviced by the disclosed devices (4×2), to one in which two upstream and two downstream groups are serviced by the same device (2×2), other configurations are readily available. FIG. 5 for example, shows a system 400 that alternates between a 6×3 configuration and a 3×3 configuration by including three ASICs 412a, 412b, and 412c, three switches 416a, 416b, and 416c, and threes splitters 418a, 418b, and 418c. Each of the splitters 418a, 418b, and 418c route signals from a respective one of SG1, SG3, and SG5 to a respective one of the downconverters 414a such that, when the switches 416a, 416b, and 416c are thrown to the proper position, the downconverted, filtered signals replace signals from SG2, SG4, and SG6 so that SG1, SG3, and SG5 can obtain upstream bandwidth at approximately DOCSIS 4.0 levels. In the downstream direction, downstream signals are upconverted by respective ones of the three upconverters 414b, and additional content added by QAM modulator 420 to fill out the additional downstream spectrum. As with FIG. 3, in the specific embodiment shown in FIG. 5, a single FPGA/RFSoC unit 410 is used. However, unlike FIG. 3, external switches are used with no digital return provided for DOCSIS 3.1 upstream transmission. Those of ordinary skill in the art will appreciate, however, that other embodiments may add digital return functionality, and also use digital switching inside the FPGA/RFSoC unit 410 rather than external switches 416a, 416b, and 416c. Those of ordinary skill in the art will also understand that other embodiments may use different numbers of ASICs, downconverters, upconverters, etc. to service varying numbers of service groups. For example, the disclosed systems and methods may include only a single ASIC that alternately services two upstream service groups or one service group depending on the mode of operation.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. An apparatus comprising:
a processing device having a first input port and a second input port, the processing device configured to receive an upstream signal from a service group;
a downconverter that receives the upstream signal and downconverts a first portion of the upstream signal; and
a switch that, in a first configuration causes the upstream signal to be received only in the first input port without downconverting any of the upstream signal, and in a second configuration causes the second portion of the signal to be received in the first input port without downconverting the second portion and causes the downconverted first portion to be received in the second input port.

2. The apparatus of claim 1 residing in a node of a CATV network.

3. The apparatus of claim 1 residing in a head end of a CATV network.

4. The apparatus of claim 1 including a bandpass filter associated with the downconverter and which separates the first portion from the second portion.

5. The apparatus of claim 1 where the downconverter operates in a digital domain.

6. The apparatus of claim 1 including an upconverter that upconverts a downstream signal received from the processing device.

7. The apparatus of claim 6 including a second processing device that adds content to the downstream signal after upconversion.

8. The apparatus of claim 7 where the second processing device includes the downconverter and includes the upconverter.

9. The apparatus of claim 1 where the processing device is an ASIC configured to process DOCSIS 3.1 signals.

10. A node in a Hybrid Fiber-Coax (HFC) network, the node comprising:
a first input port and a second input port, together configured to receive an upstream signal from a service group comprising a plurality of cable modems;
a downconverter that receives the upstream signal and downconverts a first portion of the upstream signal and does not downconvert a second portion of the input signal; and
a switch that, in a first configuration causes the upstream signal to be received only in the first input port, and in a second configuration causes the second portion of the signal to be received in the first input port and causes the downconverted first portion to be received in the second input port.

11. The node of claim 10 including a bandpass filter associated with the downconverter and which separates the first portion from the second portion.

12. The node of claim 10 where the downconverter operates in a digital domain.

13. The node of claim 10 including an upconverter that upconverts a downstream signal received from the processing device.

14. The node of claim 13 including a processing device that adds content to the downstream signal after upconversion.

15. The node of claim 14 where the processing device includes the downconverter and includes the upconverter.

16. The node of claim 14 where the first processing device is an ASIC configured to process DOCSIS 3.1 signals.

* * * * *